US009447695B2

(12) United States Patent
Baumann et al.

(10) Patent No.: US 9,447,695 B2
(45) Date of Patent: Sep. 20, 2016

(54) DIFFUSER SEAL FOR GEARED TURBOFAN OR TURBOPROP ENGINES

(75) Inventors: Paul W. Baumann, Amesbury, MA (US); Charles H. Warner, South Portland, ME (US); Brian Ellis Clouse, Saugus, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 801 days.

(21) Appl. No.: 13/409,758

(22) Filed: Mar. 1, 2012

(65) Prior Publication Data

US 2013/0230386 A1 Sep. 5, 2013

(51) Int. Cl.
F01D 9/04 (2006.01)
F01D 11/00 (2006.01)
F02C 7/28 (2006.01)
F02C 7/36 (2006.01)

(52) U.S. Cl.
CPC ............. *F01D 11/003* (2013.01); *F01D 11/00* (2013.01); *F02C 7/28* (2013.01); *F02C 7/36* (2013.01); *F05D 2220/36* (2013.01); *F05D 2260/40311* (2013.01); *Y10T 29/49229* (2015.01)

(58) Field of Classification Search
CPC .......... F01D 11/003; F02C 7/28; F02C 7/36; F05D 2220/36
USPC ..................... 415/170.1, 173.7, 174.4, 174.5
See application file for complete search history.

(56) References Cited

U.S. PATENT DOCUMENTS

| 4,190,397 | A | * | 2/1980 | Schilling et al. ............. 415/112 |
| 4,466,239 | A | * | 8/1984 | Napoli .................... F01D 5/082 |
| | | | | 415/116 |
| 4,697,981 | A | * | 10/1987 | Brown et al. ................. 415/104 |
| 6,082,967 | A | * | 7/2000 | Loisy ............................ 416/129 |
| 7,296,415 | B2 | * | 11/2007 | Coulon et al. ................... 60/799 |
| 7,465,148 | B2 | * | 12/2008 | Klinger ........................ 415/107 |
| 7,819,622 | B2 | * | 10/2010 | Paulino et al. ............... 415/104 |
| 2007/0084183 | A1 | * | 4/2007 | Moniz et al. .................... 60/204 |
| 2007/0264133 | A1 | | 11/2007 | Schwarz et al. |
| 2008/0041064 | A1 | * | 2/2008 | Moore et al. .................... 60/782 |
| 2008/0112793 | A1 | * | 5/2008 | Lee et al. ...................... 415/115 |
| 2008/0302907 | A1 | | 12/2008 | Schafer |
| 2009/0180864 | A1 | * | 7/2009 | Alvanos et al. ........... 415/173.1 |
| 2009/0252600 | A1 | | 10/2009 | Winter et al. |
| 2010/0011740 | A1 | | 1/2010 | McVey |
| 2010/0058769 | A1 | | 3/2010 | Baran |
| 2011/0286836 | A1 | | 11/2011 | Davis |

* cited by examiner

*Primary Examiner* — Dwayne J White
*Assistant Examiner* — Kayla McCaffrey
(74) *Attorney, Agent, or Firm* — Cantor Colburn LLP

(57) ABSTRACT

A diffuser seal for an aft end of a high pressure compressor of a gas turbine engine is disclosed. The diffuser seal includes a flow guide carrier coupled to the diffuser case. The flow guide carrier is also coupled to a static seal. The static seal engages a rotary seal and permits air flow through the static and rotary seals in the aft direction. The flow guide carrier is also coupled to a fairing and a fairing/hub support. The flow guide carrier supports the fairing in a spaced-apart position with respect to the rear hub so that air flowing through the static and rotary seals passes between a forward surface of the fairing and the rear hub. The fairing/hub support extends forward from the flow guide support and engages an aft surface of the fairing thereby limiting movement of the rear hub and fairing in the aft direction. This design helps to prevent parts or debris from piercing the rear hub and entering the high pressure turbine in the even of a fan blade-out or fan blade-off event.

18 Claims, 3 Drawing Sheets

DIFFUSER SEAL FOR GEARED TURBOFAN OR TURBOPROP ENGINES

TECHNICAL FIELD

This disclosure relates to diffuser seals for geared turbofan or turboprop engines and, more specifically, towards diffuser seals that prevent damage to the high pressure turbine of such engines in the event of shaft failure during a fan blade-out (FBO) event.

BACKGROUND

A geared turbofan engine is a type of turbofan airplane engine, similar to a turbojet. It consists of a geared ducted fan with a smaller diameter turbojet engine mounted behind it that powers the fan. Part of the airstream passes through the core of the engine, which includes low and high pressure compressors, a combustion chamber and high and low pressure turbines. The high and low pressure turbines drive the compressors and the fan.

The bypass ratio is the ratio of the amount of air entering the nacelle to the amount of air that passes through the core of the engine or the core nacelle. As the bypass ratio increases, the mean radius ratio of the fan and low pressure turbine increases. Consequently, if the fan is to rotate at its optimum blade speed, the low pressure turbine rotors will spin slowly, so additional low pressure turbine stages will be required to extract sufficient energy to drive the fan. Introducing a planetary reduction gearbox with a suitable gear ratio between the low pressure compressor shaft and the fan enables both the fan and low pressure turbine to operate at their optimum speeds.

Thus, in a geared turbofan, the fan produces most of the thrust and is driven through the planetary reduction gearbox, rather than being directly connected to the rest of the engine. The gearbox between the fan and low-pressure compressor and turbine allows the selection of the best possible operating speed for each engine section. Each runs much more efficiently, reducing the number of engine stages and parts.

Under normal operating conditions, the fan has a center of gravity that is coaxial with a central axis of the engine. The fan also has key natural vibratory frequencies which, by design, are higher than the maximum rotational frequency of the fan. By way of a non-limiting example, a turbofan engine having a cruising speed of 2,000-2,500 rpm and a full thrust/take-off speed of about 3,000 rpm may have key natural frequencies advantageously at least about 10% higher than the full thrust speed (e.g., about 3,300 rpm or 50.5 Hz).

During engine operation, a fan blade or a fragment thereof may become separated from the remainder of the fan (a so-called "fan blade-off" or "fan blade-out" event (FBO)) so that the center of gravity (center of mass) of the fan is displaced from the central axis. At least initially, bearings constrain the fan radially, so that it continues to rotate about the central axis rather than about an axis passing through the displaced center of gravity. However, the rotation of the displaced center of gravity about the central axis results in forces that may damage other engine components.

Upon a fan blade-off event, the engine ceases normal operation and produces no further power. However, it is typically not desirable to stop rotation of the engine's fan. If rotation of the fan were stopped, the engine would constitute an extreme source of aerodynamic drag. Such drag would be particularly significant in twin-engine aircraft wherein engines are mounted in wing nacelles. This is a common construction for many passenger aircraft. Thus, in twin-engine aircraft, the combination of drag from the stopped engine and thrust from the remaining engine would produce an excessive yawing moment not easily overcome by the aircraft rudder.

Accordingly, the damaged engine is advantageously allowed to rotate, driven by the air flow resulting from the forward velocity of the aircraft in a process called "windmilling". A windmilling engine has significantly less aerodynamic drag than does a completely stopped engine. The potentially damaging imbalance forces are transmitted from the windmilling fan through the bearings to the support frame. To remain windmilling, the engine must resist damage to the turbine, bearings, etc. The engine must also be configured to avoid catastrophic damage, which may be caused by shaft failure, and which might permit engine parts to enter the high pressure turbine. If parts or debris enter the high pressure turbine, centrifugal forces may cause the parts or debris to puncture one or both of the nacelles, the fuselage or allow the engine to detach from the aircraft or damage the wing.

SUMMARY OF THE DISCLOSURE

In one aspect, a diffuser seal for an aft end of a high pressure compressor of a gas turbine engine is disclosed. The high pressure compressor includes an aft rotor. The aft rotor is coupled to a rotary seal. The gas turbine engine includes a rear hub and a diffuser case. The diffuser seal includes a flow guide carrier coupled to the diffuser case. The flow guide carrier is coupled to a static seal. The static seal engages the rotary seal and permits air flow through the static and rotary seals in an aft direction. The flow carrier is also coupled to a fairing and a fairing/hub support. The flow guide carrier supports the fairing in a spaced-apart position with respect to the rear hub so that air flowing through the static and rotary seals passes between a forward surface of the fairing and the rear hub. The fairing/hub support extends forward from the flow guide support and engages an aft surface of the fairing thereby limiting movement of the rear hub and fairing in the aft direction.

In another aspect, a gas turbine engine is disclosed which includes a high pressure compressor including an aft rotor. The aft rotor is coupled to a rotary seal. The gas turbine engine also includes a rear hub, a diffuser case and a diffuser seal. The diffuser seal includes a flow guide carrier coupled to the diffuser case. The flow guide carrier is coupled to a static seal. The static seal engages the rotary seal and permits air flow through the static and rotary seals in an aft direction. The flow guide carrier is also coupled to a fairing and a fairing/hub support. The flow guide carrier supports the fairing in a spaced-apart position with respect to the rear hub so that air flowing through the static rotary seals passes between a forward surface of the fairing and the rear hub. The fairing/hub support extends forward from the flow guide support and engages an aft surface of the fairing thereby limiting movement of the rear hub and fairing in the aft direction.

In yet another aspect, a method for preventing damage to a high pressure turbine of a gas turbine engine is a result of a fan blade-out or a fan blade-off event. The high pressure compressor includes an aft rotor. The aft rotor is coupled to a rotary seal. The gas turbine engine also includes a diffuser case. The method includes providing a diffuser seal including a flow guide carrier coupled to the diffuser case. The flow guide carrier is coupled to a static seal. The static seal engages the rotary seal but permits air flow between the static and rotary seals in an aft direction. The method further includes coupling the flow guide carrier to a fairing. The flow guide carrier supports the fairing in a spaced-apart position with respect to the rear hub so that air flowing through the static and rotary seals passes between a forward surface of the fairing and the rear hub. The method also includes coupling the flow guide carrier to a fairing/hub support. The fairing/hub support extends forward from the flow guide support and engages an aft surface of the fairing thereby limiting movement of the rear hub and fairing in the aft direction.

DETAILED DESCRIPTION

Figure 1:
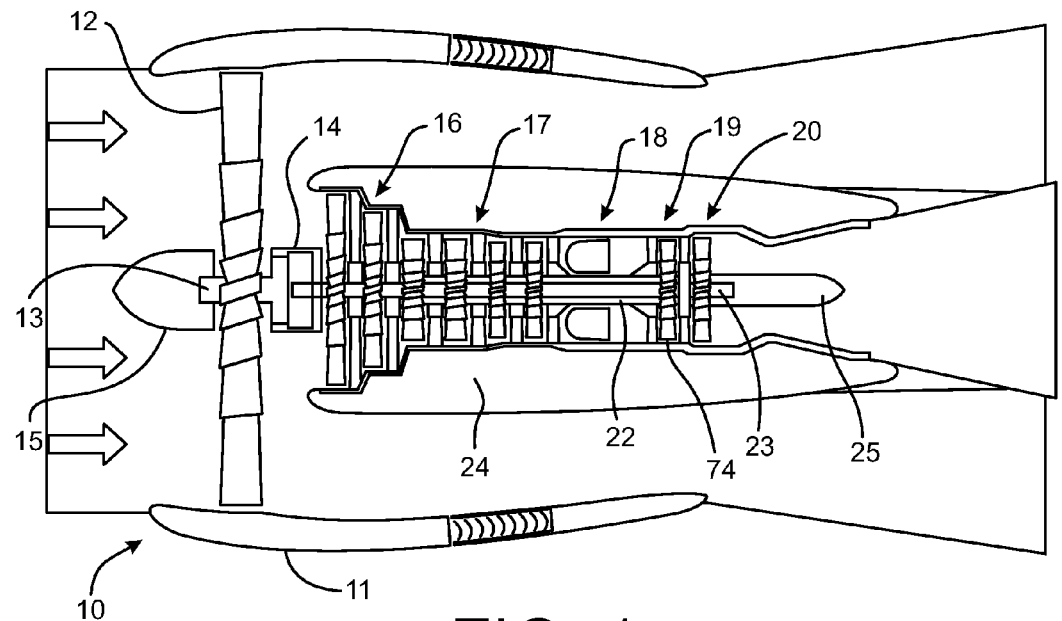
FIG. 1 is a sectional and schematic view of an exemplary gas turbine engine.

FIG. 1 illustrates a gas turbine engine 10 that is of the turbofan type. The engine 10 includes a nacelle 11 which surrounds a fan 12 that is mounted to a shaft 13 that is coupled to a gearbox 14. An aerodynamic nose 15 is typically mounted in front of the fan 12. The gearbox 14 is coupled to a low pressure compressor 16 which is disposed forward of a high pressure compressor 17. The high pressure compressor 17 is disposed forward of a combustor 18 which, in turn, is disposed forward of a high pressure turbine 19 and a low pressure turbine 20. The high pressure turbine 19 is mounted onto a high pressure shaft 22 which drives the high pressure compressor 17. The low pressure turbine 20 is mounted onto a low pressure shaft 23 which drives the low pressure compressor 16. The low pressure compressor 16, high pressure compressor 17, combustor 18, high pressure turbine 19 and low pressure turbine 20 are housed within a core nacelle 24.

The engine 10 may be a high-bypass geared turbofan aircraft engine. The engine 10 may have a bypass ratio that is greater than 10 with a fan 12 diameter that is significantly larger than the low pressure compressor 16. The low pressure turbine 20 may have a pressure ratio that is greater than 5. The gear train 14 may be an epicyclic geartrain such as a planetary gear system or other gear system with a gear reduction ratio of greater than 2.5.

Air flow enters the nacelle 11 which at least partially surrounds the core nacelle 24. The fan 12 communicates air flow into the core nacelle 24 to power the low pressure compressor 16 and the high pressure compressor 17. Core air flow compressed by the low pressure compressor 16 and high pressure compressor 17 are mixed with the fuel in the combustor 18 where it is ignited, and burned. The resultant high pressure combustor products are expanded through the high pressure turbine 19 and low pressure turbine 20. The turbines 19, 20 are rotationally coupled to the compressors 17, 16 respectively to drive the compressors 17, 16 in response to expansion of the combustor product. The low pressure turbine 20 also drives the fan 12 through the geartrain 14. An exhaust stream exits the core nacelle 24 past a tail cone 25.

Figure 2:
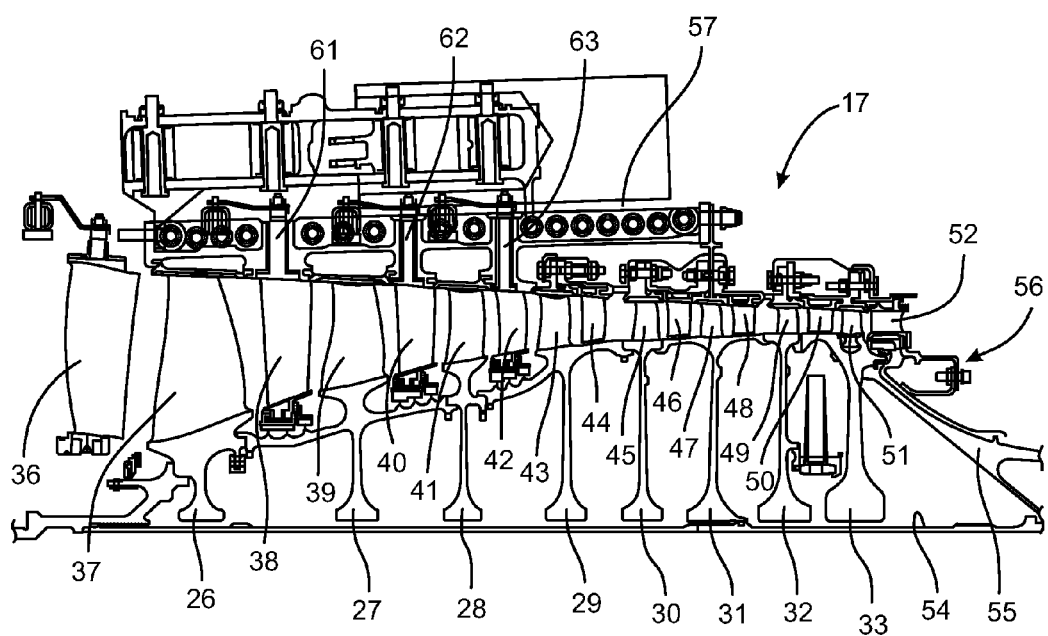
FIG. 2 is a partial sectional view of a high pressure compressor section of a gas turbine engine.

Turning to FIG. 2, as a non-limiting example, a high pressure compressor section 17 is disclosed that includes rotors 26, 27, 28, 29, 30, 31, 32, 33 and stators, single vanes of which are shown at 36, 37, 38, 39, 40, 41, 42, 43, 44, 45, 46, 47, 48, 49, 50, 51, including an exit guide vane 52. The number of rotors and stators can vary widely as will be appreciated by those skilled in the art. The rotors 26-33 are coupled to the high pressure shaft 54. A rear hub 55 is disposed at the aft end of the high pressure compressor 17. Behind the rear hub 55 is a diffuser seal assembly 56. The diffuser seal assembly 56 will be explained in greater detail in connection with FIGS. 3-5 below. Still referring to FIG. 2, the high pressure compressor 17 is contained within a shroud 57 which is connected directly to vanes 38, 40, 42 by way of the brackets 61, 62, 63.

Figure 3:
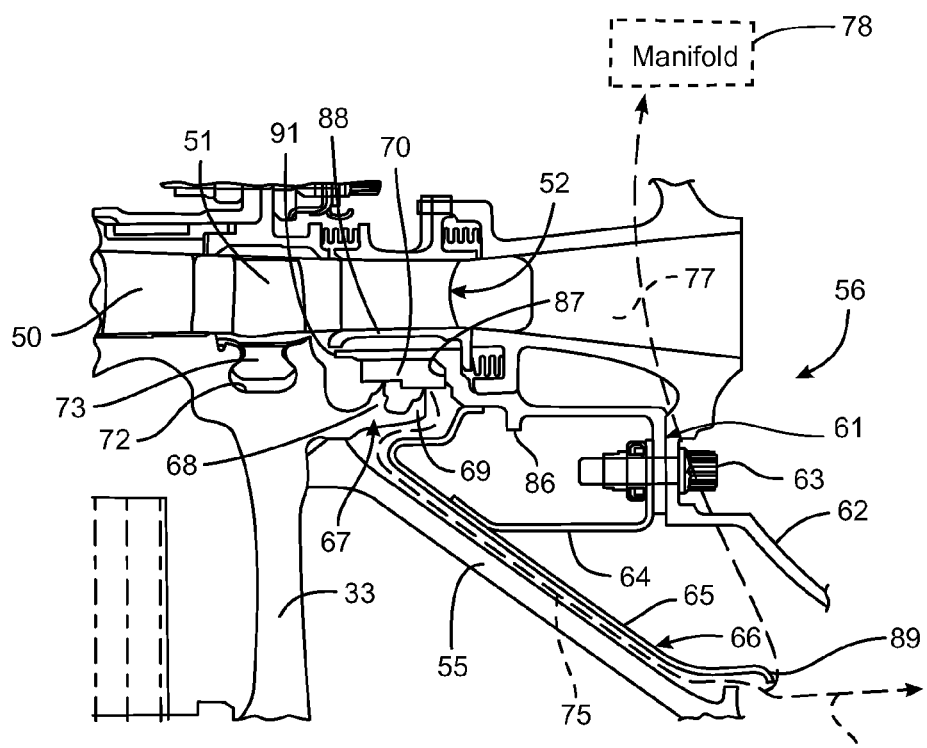
FIG. 3 is an enlarged partial sectional view of the high pressure compressor section shown in FIG. 2, particularly illustrating the disclosed diffuser seal.

Turning to FIG. 3, the diffuser seal assembly 56 is shown in greater detail. The diffuser seal assembly 56 includes a flow guide carrier 61 which is coupled to a support 62 by a bolt or fastener 63. The flow guide carrier 61 is also coupled to a fairing/hub support 64 which engages an aft surface 65 of the fairing 66. The fairing 66 is disposed behind, but in close proximity to the rear hub 55. The rear hub 55 is disposed aft of the eighth rotor 33. The eighth rotor 33 includes a knife edge seal 67 with forward an aft sealing elements 68, 69. The sealing elements 68, 69 engage forward and aft portions of a static seal 70, which may be a honeycomb seal. The aft rotor 33 also includes a recess 72 for accommodating an extension 73 of the vane 51. Disposed aft of the vane 51 is the exit guide vane 52 which is coupled to the flow guide carrier 61.

In the event of a fan blade-out or fan blade-off event, the entire higher pressure rotor 33 and the hub 55 may be blown in the aft direction. The diffuser seal assembly 56 is provided to stop aftward movement of the rotor 33 and absorb the high kinetic energy of the rotor 33. Specifically, the fairing 66, supported by the fairing/hub support 64 and the flow guide carrier 61 will contain aftward moving rotor 33 (or to the right in FIG. 3). Thus, the disclosed diffuser seal assembly 66 protects the combustor 18 and the high and low pressure turbines 19, 20 by containing the aftward moving rotor 33 in the event of a shaft failure during a fan blade-out or fan blade-off event.

Further, in addition to its reinforcing function, the fairing 66 directs cooling air along the rear hub 55 and provides cooling air to the high pressure turbine rotor 74 (FIG. 1) and additional turbine cooling air to a manifold 78. Specifically, some air is allowed to pass through the knife edge seal 67 and static seal 70 as illustrated by the phantom line 75. This air stream is split into two parts as shown by the phantom lines 76, 77. The air flow represented by the line 76 flows towards the high pressure turbine rotor 74 (FIG. 1) while the air flow represented by the line 77 flows towards a manifold 78 that provides additional turbine cooling air.

The diffuser seal assembly 56 controls loads on the rotor bearings by controlling the pressure of the air on the aft side of the hub 55, which it does by controlling the volume of the air passing through the knife edge seal 67 and between the hub 55 and fairing 66. Controlling this air pressure controls the net axial force applied to the rotor 33, and therefore into the rotor bearings, which in turn reduces wear on the rotor bearings.

Figure 4:
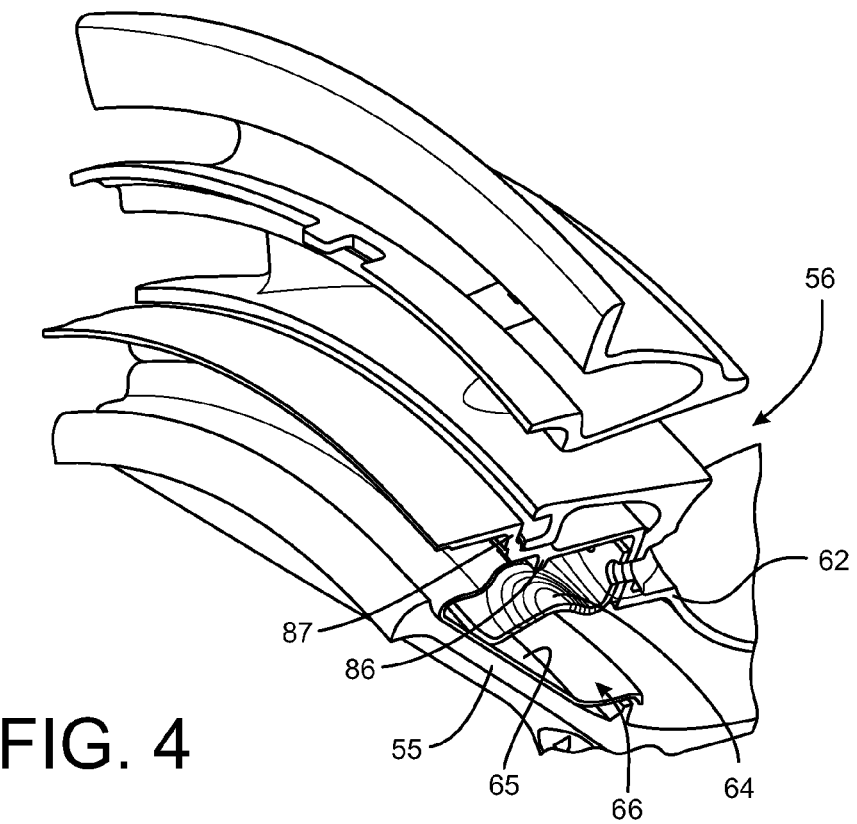
FIG. 4 is a partial sectional and perspective view of the rear hub, fairing, flow guide carrier and fairing/hub support shown in FIG. 3, but with the fairing/hub support in a damaged condition that could be caused by a FBO incident.
Figure 5:
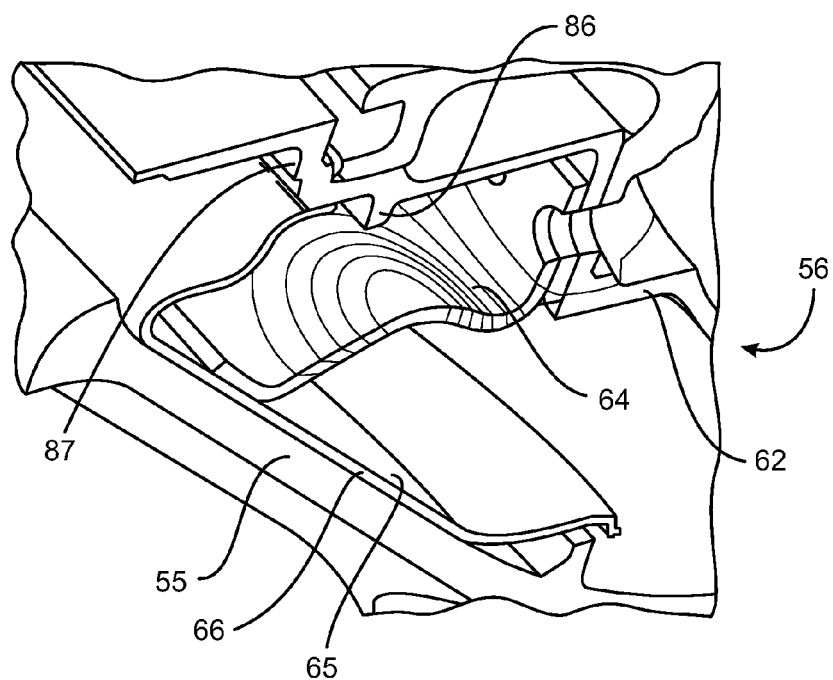
FIG. 5 is an enlarged sectional and perspective view of the rear hub, fairing, flow guide carrier and fairing/hub support shown in FIGS. 3-4.

Perspective views of the diffusers seal assembly 56 are shown in FIGS. 4-5. Referring to FIGS. 3-5, the flow guide carrier 61 includes a stiffening rib 86 and also a vertical wall 87 which supports the static seal 70 and forms a static seal carrier. The flow guide carrier 61 also is coupled to the diffuser case 88 which axially retains the exit guide vane 52. Finally, the fairing 66 includes a stiffened distal end 89 which helps direct the air flows 76, 77 and improves the structural integrity of the fairing 66. The fairing/hub support 64 shows the type of damage that can be done by a FBO incident.

INDUSTRIAL APPLICABILITY

A diffuser seal assembly 56 is disclosed which provides fan blade-out or fan blade-off snubbing capability. That is, in the event of a shaft failure during a fan blade-out or fan blade-off event, parts or debris will be expelled in the aft direction towards the high and low pressure turbines 19, 20. In order to prevent damage to the turbines and parts penetrating the core nacelle 24, the diffuser seal assembly 56 effectively braces or adds structural integrity to the rear hub 55 by way of the fairing 66, fairing/hub support 64 and flow guide carrier 62. Further, a lip 91 disposed at the distal end of the flow guide carrier 62 provides additional support for the static seal 70 and helps to axially retain the exit guide vane 52.

What is claimed is:

1. A diffuser seal for an aft end of a high pressure compressor of a gas turbine engine, the high pressure compressor including an aft rotor, the aft rotor being coupled to a rotary seal, the rotary seal extending aft the high pressure compressor and including a forward sealing element and an aft sealing element, and the gas turbine engine including a rear hub and a diffuser case, the diffuser case having an inner circumference and an outer circumference, the diffuser case including an exit guide vane positioned between the inner circumference and the outer circumference, the diffuser seal comprising:

a flow guide carrier, the flow guide carrier having a proximal end and a distal end, the flow guide carrier further including a lip disposed at the distal end, the flow guide carrier including a portion located radially inward from and coupled to the diffuser case and radially outward from and coupled to a static seal, the static seal having a forward portion and an aft portion, the forward portion engaging the forward sealing element and the aft portion engaging the aft sealing element and permitting air flow through the static and rotary seal in an aft direction, the portion located radially inward from and coupled to the diffuser case and radially outward from and coupled to the static seal providing support for the static seal and axially retains the exit guide vane; and the flow guide carrier also being coupled to a fairing and a fairing/hub support, wherein the fairing is operatively coupled to the flow guide carrier at a first end proximate to the static seal and the fairing has a second free end opposite the first end, the flow guide carrier supporting the fairing in a spaced-apart position with respect to a surface of the rear hub so that air flowing through the static and rotary seals passes between a forward surface of the fairing and the surface of the rear hub, the fairing/hub support extending forward from the flow guide carrier and engaging an aft surface of the fairing, wherein the fairing/hub support is configured to limit movement of the rear hub and the fairing in the aft direction and wherein the second free end of the fairing directs air flows exiting from between the forward surface of the fairing and the surface of the rear hub.

2. The diffuser seal of claim 1 wherein the gas turbine engine also includes a high pressure turbine and at least some of the air flowing between the forward surface of the fairing and the rear hub is directed to a high pressure turbine for cooling.

3. The diffuser seal of claim 1 wherein the gas turbine engine includes a high pressure turbine and a manifold, the high pressure compressor includes seven rotors spaced apart and disposed forward of the aft rotor, at least some of the air flowing between the forward surface of the fairing and the rear hub is directed to the manifold, the manifold is also in communication with air flowing between two rotors of the high pressure compressor disposed forward of the aft rotor, the manifold directing the at least some of the air flowing between the fairing and rear hub and at least some of the air flowing between said two rotors disposed forward of the aft rotor to the high pressure turbine for cooling.

4. The diffuser seal of claim 1 wherein the gas turbine engine includes a high pressure turbine and a manifold, the high pressure turbine including a forward rotor, the high pressure compressor includes seven rotors spaced apart and disposed forward of the aft rotor, at least some of the air flowing between the forward surface of the fairing and the rear hub is directed to the manifold and at least some of the air flowing between the forward surface of the fairing and the rear hub is directed to the forward rotor of the high pressure turbine, the manifold is also in communication with air flowing between two rotors of the high pressure compressor disposed forward of the aft rotor, the manifold directing at least some of the air flowing between the forward surface of the fairing and the rear hub and at least some of the air flowing between said two rotors disposed forward of the aft rotor to the high pressure turbine for cooling.

5. The diffuser seal of claim 1 wherein the static seal is a honeycomb seal.

6. The diffuser seal of claim 1 wherein the rotary seal is a knife edge seal.

7. The diffuser seal of claim 1 wherein the rotary seal includes two spaced-apart sealing elements that engage the static seal.

8. The diffuser seal of claim 1 wherein the high pressure compressor also includes an exit guide vane.

9. A gas turbine engine comprising:

a high pressure compressor, the high pressure compressor including an aft rotor, the aft rotor including a rotary seal, the rotary seal extending aft the high pressure compressor and including a forward sealing element and an aft sealing element;

a rear hub;

a diffuser case, the diffuser case having an inner circumference and an outer circumference, the diffuser case including an exit guide vane positioned between the inner circumference and the outer circumference;

a static seal, the static seal located radially inward the diffuser case and radially outward the rotary seal, the static seal having a forward portion and an aft portion, the forward sealing element engaging the forward portion and the aft sealing element engaging the aft portion and permitting air flow through the static seal and rotary seal in the aft direction;

a diffuser seal, the diffuser seal including a flow guide carrier, the flow guide carrier having a proximal end and a distal end, the flow guide carrier further including a lip disposed at the distal end, the flow guide carrier including a portion located radially inward from and coupled to the diffuser case and radially outward from and coupled to the static seal that provides support for the static seal and axially retains the exit guide vane; and the flow guide carrier also being coupled to a fairing and a fairing/hub support, wherein the fairing is operatively coupled to the flow guide carrier at a first end proximate to the static seal and the fairing has a second free end opposite the first end, the flow guide carrier supporting the fairing in a spaced-apart position with respect to a surface of the rear hub so that air flowing through the static and rotary seals passes between a forward surface of the fairing and the surface of the rear hub, the fairing/hub support extending forward from the flow guide carrier and engaging an aft surface of the fairing, wherein the fairing/hub support is configured to limit movement of the rear hub and the fairing in the aft direction and wherein the second free end of the fairing directs air flows exiting from between the forward surface of the fairing and the surface of the rear hub.

10. The gas turbine engine of claim 9 further including a high pressure turbine and at least some of the air flowing between the forward surface of the fairing and the rear hub is directed to a high pressure turbine for cooling.

11. The gas turbine engine of claim 9 further including a high pressure turbine and a manifold, the high pressure compressor further includes seven rotors spaced apart and disposed forward of the aft rotor, at least some of the air flowing between the forward surface of the fairing and the rear hub is directed to the manifold, the manifold is also in communication with air flowing between two rotors of the high pressure compressor disposed forward of the aft rotor, the manifold directing the at least some of the air flowing between the fairing and rear hub and at least some of the air flowing between said two rotors disposed forward of the aft rotor to the high pressure turbine for cooling.

12. The gas turbine engine of claim 9 wherein the gas turbine engine includes a high pressure turbine and a manifold, the high pressure turbine including a forward rotor, the high pressure compressor includes seven rotors spaced apart and disposed forward of the aft rotor, at least some of the air flowing between the forward surface of the fairing and the rear hub is directed to the manifold and at least some of the air flowing between the forward surface of the fairing and the rear hub is directed to the forward rotor of the high pressure turbine, the manifold is also in communication with air flowing between two rotors of the high pressure compressor disposed forward of the aft rotor, the manifold directing at least some of the air flowing between the forward surface of the fairing and the rear hub and at least some of the air flowing between said two rotors disposed forward of the aft rotor to the high pressure turbine for cooling.

13. The gas turbine engine of claim 9 wherein the static seal is a honeycomb seal.

14. The gas turbine engine of claim 9 wherein the rotary seal is a knife edge seal.

15. The gas turbine engine of claim 9 wherein the rotary seal includes two spaced-apart sealing elements that engage the static seal.

16. The gas turbine engine of claim 9 wherein the high pressure compressor also includes an exit guide vane.

17. The gas turbine engine of claim 9 wherein the gas turbine engine is a geared turbofan.

18. A method for preventing damage to a high pressure turbine of a gas turbine engine as a result of a fan blade-out or fan blade-off event, the high pressure compressor including an aft rotor, the aft rotor being coupled to a rotary seal, the rotary seal extending aft the high pressure compressor and including a forward sealing element and an aft sealing element, the gas turbine engine also including a diffuser case, the diffuser having an inner circumference and an outer circumference and an exit guide positioned between the inner circumference and the outer circumference, the method comprising:

providing a diffuser seal including a flow guide carrier, the flow guide carrier having a proximal end and a distal end, the flow guide carrier further including a lip disposed at the distal end, the flow guide carrier including a portion located radially inward from and coupled to the diffuser case and radially outward from and coupled to a static seal, the static seal, the static seal having a forward portion and an aft portion, the forward sealing element engaging the forward portion and the aft sealing element engaging the aft portion and permitting air flow through the static and rotary seal in an aft direction, the portion of the flow guide carrier located radially inward from and coupled to the diffuser case and radially outward from and coupled to the static seal axially retaining the exit guide vane;

coupling the flow guide carrier to a fairing, wherein the fairing is operatively coupled to the flow guide carrier at a first end proximate to the static seal and the fairing has a second free end opposite the first end, the flow guide carrier supporting the fairing in a spaced-apart position with respect to a surface of rear hub so that air flowing through the static and rotary seal passes between a forward surface of the fairing and the surface of the rear hub;

coupling the flow guide carrier to a fairing/hub support, the fairing/hub support extending forward from the flow guide carrier and engaging an aft surface of the fairing, wherein the fairing/hub support is configured to limit movement of the rear hub and the fairing in the aft direction and wherein the second free end of the fairing directs air flows exiting from between the forward surface of the fairing and the surface of the rear hub.

\* \* \* \* \*